United States Patent
De Putter

[15] 3,665,968
[45] May 30, 1972

[54] INSULATED TUBE

[72] Inventor: Warner Jan De Putter, Zwolle, Netherlands

[73] Assignee: Industriele Onderneming Wavin N.V., Zwolle, Netherlands

[22] Filed: Mar. 12, 1970

[21] Appl. No.: 18,949

[30] Foreign Application Priority Data

Mar. 13, 1969 Netherlands..........................6903871

[52] U.S. Cl. ..........................138/141, 138/149, 138/DIG. 2
[51] Int. Cl..........................................................F16l 9/14
[58] Field of Search..............138/141, 149, 140, 137, DIG. 2

[56] References Cited

UNITED STATES PATENTS

| | | | |
|---|---|---|---|
| 3,406,724 | 10/1968 | Carlstrom et al. | 138/137 |
| 3,415,288 | 12/1968 | Marshack | 138/141 |
| 3,425,455 | 2/1969 | Kilpert et al. | 138/143 |

*Primary Examiner*—Houston S. Bell, Jr.
*Attorney*—Woodhams, Blanchard & Flynn

[57] ABSTRACT

An insulated tube comprising an inner protective layer of polyurethane or hard polyurethane foam plastic, an intermediate layer of polyurethane foam plastic insulation and an outer layer of glass fiber reinforced polyester resin. Reinforcing glass tissue layers might be present in the space between the inner and outer layers. The polyurethane foam plastic insulation is resistant to temperatures over 120° C.

2 Claims, 1 Drawing Figure

Patented May 30, 1972
3,665,968
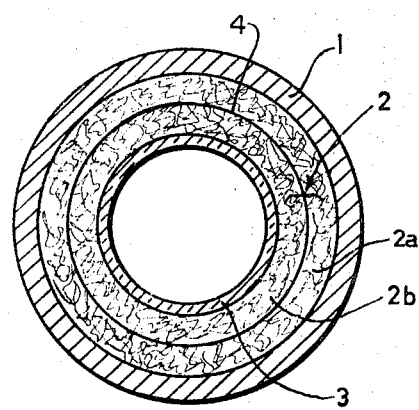
INVENTOR
WARNER JAN DE PUTTER
BY
Woodhams, Blanchard & Flynn
ATTORNEYS 3,665,968

INSULATED TUBE

BACKGROUND OF THE INVENTION

The invention relates to insulated tubes provided with an insulation of foam plastic.

Such tubes are known per se, In these known tubes the foam plastic insulation is however on the outer side of the tube. Sometimes, however, this is undesirable since on conveying flowable cold mediums through these tubes the cold medium will directly act upon the tube, whereby the latter is alternately exposed to considerable expansion and shrinkage. Owing thereto injuries, such as cracking, may be easily produced in the insulation at the location whereat the tubes are connected.

BRIEF SUMMARY OF THE INVENTION

It is now an object of the invention to obviate these difficulties and to manufacture pipes e.g., from steel, synthetic resins, whether or not provided with reinforcements, asbestos, ceramics, mineral materials or concrete and more particularly from fiber reinforced synthetic resins which do not exhibit these disadvantages.

This object is attained according to the invention in the way that an outer tube is provided with a foam plastic tube insulation preferably resistant to temperatures over 120° C situated on the inner side thereof; and the foam plastic insulation layer on the inner side thereof is provided with an inner tube which provides a protective finishing plastic layer which is resistant to the medium to be conveyed.

Such composite tubes may be employed for conveying cold mediums without the aforementioned difficulties being experienced.

According to a preferred embodiment at least one reinforcing layer is present between the protective finishing layer and the tube e.g., in the foam plastic insulation. Examples of such reinforcing layers are tissues or non wovens of hydrophobic material such as polyester fibers, glass fibers, foil materials such as polyethylene foils and filaments which are wound around the protective finishing layer or at one or more intermediate points of the foam plastic during formation of the foam plastic insulation.

The best results are obtained with one or more coarse meshed reinforcing layers. By means of one or more of these reinforcing layers any cracking in the protective layer or in the foam insulation caused by expansion or shrinking of the composite tube will stop after having reached a reinforcing layer and in this way the insulation capacity is secured even if cracking occurs.

The best results are obtained by applying one or more coarse meshed reinforcing layers, as the coarse meshes permit a connection of the materials constituting the material layers at both sides of the reinforcing layers.

The protective finishing layer or inner tube, situated on the inner side of the foam plastic insulation, consists advantageously of the same plastic as the plastic used for making the foam plastic insulation and may consist of e.g., polyurethane or hard polyurethane foam plastic.

Due to the application of a hard foam plastic the penetration of liquid mediums conveyed by such a tube, into the foam plastic insulation can be counteracted. In order to avoid a possible attack of the plastic it is further possible to provide the free innerside of the hard foam plastic layer, which comes into contact with the medium to be conveyed, with a protective finishing layer in the form of a layer which consists of the same plastic as used for making the hard foam plastic.

The foam plastic insulation may e.g., be provided by centrifuging, whereby at the end of the operation easily an additional protective layer can be provided on the foam plastic insulation.

It is also possible, during the centrifugation for the provision of the foam plastic insulation to incorporate mineral particles into the plastic to be expanded, whereby a better resistance of the foam plastic insulation is obtained.

BRIEF DESCRIPTION OF THE DRAWING

In the drawing the FIGURE shows a section through a glass fiber reinforced polyester tube which on its inner side is provided with a foam plastic insulation layer and a protective finishing layer.

DESCRIPTION OF A PREFERRED EMBODIMENT

The glass fiber reinforced polyester outer tube 1 is provided with a foam plastic insulation layer 2 consisting of a polyurethane foam plastic, although other foam plastics may also be applied. The layer 2 may consist of a soft polyurethane foam plastic layer 2a and a hard polyurethane foam plastic layer 2b. The layer 2b is provided with a protective finishing polyurethane layer 3 which forms an inner tube.

The foam plastic layer 2 may be provided on the inner side of the tube 1 by the aid of centrifugation. After centrifuging a protective finishing plastic layer 3, which is resistant to the medium to be conveyed, can be provided by centrifuging.

It is also possible to perform at first a polyurethane foam plastic tube 2 on a core, whereupon glass fibers are wound around this preformed polyurethane foam plastic tube, whereupon a thermosetting resin and a catalyst are applied thereto and the whole is allowed to harden to form the tube 1. In this case the inner side of the foam plastic tube might be slightly porous and a finishing layer 3, e.g., consisting of a thermosetting resin such as a polyester or a polyurethane is provided.

According to a very recommended embodiment a liquid polyurethane is provided on a core, whereupon a reinforcing layer in the form of a glass fiber tissue having meshes of 1 × 1 mm is applied to the polyurethane layer or inner tube 3. After the glass fiber tissue a liquid composition containing polyurethane and a blowing agent is applied to the polyurethane tube 3 provided with the tissue. During the provision of the liquid composition from which a polyurethane foam plastic is obtained a second reinforcing layer of a glass fiber tissue 4 having meshes of 1 × 1 mm may be positioned between the two layers 2a and 2b. Obviously these layers 2a and 2b may also consist of the same polyurethane foam. Advantageously the reinforcing layer or layers are embedded in the polyurethane materials when they are still in a liquid or semi-liquid condition.

Preferably the polyurethane foam is resistant to temperatures over 120° C (polyurethane EME 140).

After formation of the polyurethane foam insulation 2 glass fibers (or fibers of other materials) and thermosetting resin are applied to form tube 3. At last the core, is removed from the inner side of the composite tube.

It is also possible to obtain the protective finishing layer 3 by applying a liquid composition containing polyurethane and blowing agent to a cold core. Due to the low temperature of the core the blowing agent will be hardly decomposed and consequently a protective finishing layer 3 of polyurethane or of a hard polyurethane foam layer will be obtained.

A last fibers or other fibers may be wound around the core before applying the mixture of polyurethane and blowing agent or an epoxy or polyester resin.

What is claimed is:

1. A composite tube construction, particularly for permitting conveying therethrough of a flowable cold medium, said composite tube comprising an inner tube constructed of a hard plastic material for permitting a flowable medium to by conveyed therethrough, an outer tube substantially concentric with and disposed in surrounding relationship to said inner tube, said outer tube being constructed of a fiber reinforced thermosetting resin and being spaced from said inner tube to define an annular space therebetween, a thin annular reinforcing layer disposed within said annular space in surrounding relationship to said inner tube, said annular reinforcing layer being radially spaced from both said inner tube and said outer tube, and an intermediate annular layer of foamed plastic insulating material disposed within and substantially filling the annular space between the inner and outer tubes, said annular reinforcing layer being embedded within the annular layer of foamed plastic insulating material and being spaced from the inner and outer peripheries of the annular layer of foamed plastic insulating material, whereby the annular reinforcing layer prevents cracks within said annular of foamed plastic material, as caused by expansion or shrinkage of the composite tube, from propogating across the complete radial thickness of the annular layer of foamed plastic insulating materials.

2. A tube according to claim 1, wherein said reinforcing layer comprises a coarse mesh-like glass fiber material disposed substantially midway between the inner and outer peripheries of said layer of foam plastic material whereby the foam plastic disposed on opposite sides of the layer is integrally connected through the coarse mesh of the reinforcing layer.

* * * * *